United States Patent [19]

Takahashi

[11] Patent Number: 5,132,856
[45] Date of Patent: Jul. 21, 1992

[54] MOTOR SPINDLE FOR HARD DISC DEVICE

[75] Inventor: Masahiro Takahashi, Yokosuka, Japan

[73] Assignee: Nippon Seiko Kabushiki Kaisha, Tokyo, Japan

[21] Appl. No.: 595,830

[22] Filed: Oct. 11, 1990

[30] Foreign Application Priority Data

Oct. 13, 1989 [JP] Japan .................. 1-119225[U]

[51] Int. Cl.⁵ .............................................. G11B 17/02
[52] U.S. Cl. ................... 360/99.08; 360/98.07; 360/99.04; 384/470
[58] Field of Search ............. 360/99.08, 98.07, 99.04; 384/470, 484, 488

[56] References Cited

U.S. PATENT DOCUMENTS

| | | |
|---|---|---|
| 3,554,621 | 1/1971 | McAllister ............... 384/484 |
| 4,126,362 | 11/1978 | Hamblin et al. . |
| 4,133,588 | 1/1978 | Earsley ..................... 384/470 |
| 4,737,870 | 4/1988 | Okita ..................... 360/99.08 |
| 4,822,183 | 4/1989 | Lederman ............... 384/484 |
| 4,827,168 | 5/1989 | Nakajima ............. 384/488 X |
| 4,915,515 | 4/1990 | Rohrer et al. ......... 384/470 X |
| 4,941,759 | 7/1990 | Dreschmann et al. .. 384/470 X |

FOREIGN PATENT DOCUMENTS

| | | |
|---|---|---|
| 366903 | 7/1973 | Japan . |
| 53-23878 | 4/1975 | Japan . |
| 50-148441 | 11/1975 | Japan . |
| 55-119426 | 10/1980 | Japan . |
| 1072603 | 6/1967 | United Kingdom . |

*Primary Examiner*—John H. Wolff
*Attorney, Agent, or Firm*—Helfgott & Karas

[57] ABSTRACT

A motor spindle for a hard disk device having a pair of ball bearings each having an inner ring, an outer ring, a plurality of balls, a retainer for slidably holding the balls and having a first seal plate provided with outer and inner edges placed adjacent to the inner peripheral surface of the outer ring and the outer peripheral surface of the inner ring, and a second seal plate secured to the inner peripheral surface of the outer ring and having an inner edge placed adjacent to the outer peripheral surface of the inner ring with the first seal plates opposed to each other and with one of the second seal plates faced to a clean space for containing a hard disk.

4 Claims, 4 Drawing Sheets

F I G. 7
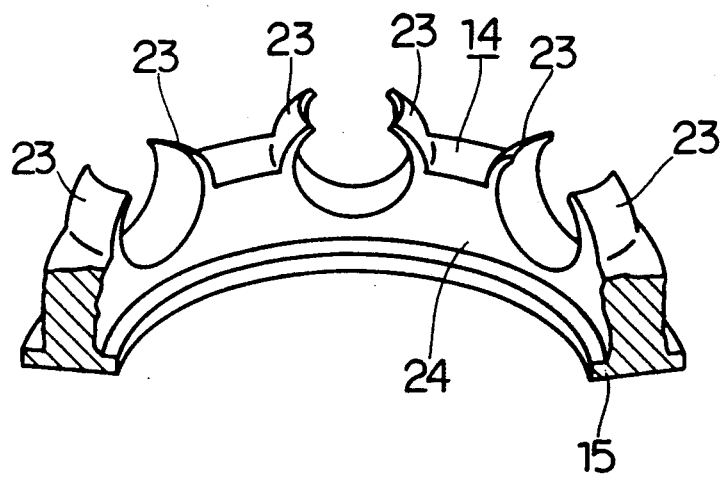

MOTOR SPINDLE FOR HARD DISC DEVICE

BACKGROUND OF THE INVENTION

1. Field of the Invention

The present invention relates to a motor spindle for a hard disc device which is utilized for rotatably driving a hard disk or a read-out arm.

2. Description of the Prior Art

FIG. 1 and FIG. 2 show a first example of a conventional motor spindle for driving a hard disc or disk. Conventionally, a motor spindle such as, for example, that shown in FIG. 1 is incorporated in a hard disk device (HDD) having a motor to rotatably drive a hard disk or a motor to drive a read-out arm.

This motor spindle is provided with a housing 2 which is secured to a mounting base or the like by means of a mounting flange 1 formed on the outer peripheral surface of the housing 2. A rotatable shaft 3 is supported in a freely rotatable manner on the inside of the housing 2 through a pair of ball bearings 4. A rotor 5 is secured to one end of the rotatable shaft 3, and a hub 6 is secured to the other end of the rotatable shaft 3. A hard disk (omitted from the drawing) is secured to the hub 6. Since precisely controlled rotation is required for motors used in the hard disk device, the rotatable shaft 3 is supported by the pair of bearings 4, where a predetermined pressure is applied to between the pair of bearings 4 to eliminate chattering.

The structure of the ball bearings 4 is illustrated in FIG. 2. The ball bearings 4 have outer and inner rings 7 and 9, respectively. An inward-facing track 8 is provided on the inner peripheral surface of the outer ring 7; an outward-facing track 10 is provided on the outer peripheral surface of the inner ring 9. A plurality of balls 11 are provided between the inward-facing track 8 and the outward-facing track 10. A retainer 12 is incorporated in the bearing 4 to maintain the balls 11 therein in a freely rotatable state. A pair of seal plates 13 are also incorporated in the bearing 4. The outer peripheral edges of the pair of seal plates 13 are supported on an inner peripheral surface at each end of the outer ring 7; the inner peripheral edges of the seal plates 13 extend close to the outer peripheral surface of the inner ring 9 at each end thereof.

Incidentally, the terms "inward", "outward", "inner" and "outer" are used to indicate radial directions around the shaft 3 in this specification.

The ball bearings 4 are installed in the motor spindle for driving the hard disk such that the outer ring 7 of each of the ball bearings 4 is interposedly secured in or fitted into the housing 2 of the motor spindle, and the inner ring 9 is arranged to fixedly enclose the rotatable shaft 3 or fitted onto the rotatable shaft 3. As a result of this configuration, the rotatable shaft 3 is supported in a freely rotatable manner on the inside of the housing 2.

In addition, the seal plates 13 supported on the inner peripheral surfaces of the outer ring 7 at each side thereof act to prevent leakage of grease which is present in the interior between the two seal plates 13.

In the ball bearings 4 as mentioned above, at least one of the pair of seal plates 13 (the upper seal plate of the upper bearing 4 and the lower seal plate of the lower bearing 4 in FIG. 2) must be provided at a position considerably separated from the balls 11 which are supported by the retainer 12. Specifically, an annular main section of the retainer 12 is positioned between the balls 11 and the at least one of the seal plates 13. Therefore, to prevent interference between the at least one of the seal plates 13 and the retainer 12 (the annular main section mentioned above), it is necessary that the balls 11 and the at least one of the seal plates 13 be sufficiently separated. Accordingly, it is difficult to fabricate the ball bearing 4 with a small width W (FIG. 2), and therefore to make the axial size T (FIG. 1) of the motor spindle incorporating this type of ball bearing small to obtain a thin motor spindle.

With the increasing popularity of lap-top models of OA equipment in recent years, the space available for installing an HDD and the like is extremely limited. Accordingly, there are strong demands for even a small reduction (for example, as small as 1 mm) in the axial size T of the motor spindle.

FIG. 3 shows a second example of a conventional motor spindle for driving a hard disk.

Conventionally, a motor or the like for driving, for example, a windshield wiper of an automobile incorporates a ball bearing of the type illustrated in FIG. 3 (see, for example, U.S. Pat. No. 3,554,621, Japanese Utility Model Applications No. S50-148441 and No. S55-119426).

This ball bearing comprises an outer ring 7, an inner ring 9, a plurality of balls 11 provided between the outer ring 7 and the inner ring 9 and a retainer 14 provided on one side of the ball bearing.

An inward-facing track 8 is formed on the inner peripheral surface of the outer ring 7; an outward-facing track 10 is formed on the outer peripheral surface of the inner ring 9; and the plurality of balls 11 are slidably supported by the retainer 14, the outer ring 7 and the inner ring 9. The retainer 14 is formed in a circular ring shape from a synthetic resin material.

A flange-shaped first seal plate 15 is provided integrally with the retainer 14 on one side thereof (the upper side in FIG. 3). The outer peripheral edge and the inner peripheral edge of the first seal plate 15 are positioned adjacent to the inner peripheral surface of the outer ring 7 and the outer peripheral surface of the inner ring 9, respectively.

The ball bearing is also provided with a second seal plate 17 which is formed in a hoop shape from a metal plate. The outer peripheral edge of the second seal plate 17 is supportedly secured to the inner peripheral surface at the other end of the outer ring 7 remote from the retainer 14.

The ball bearing shown in FIG. 3 is characterized in a compact structure, but not so good in sealing grease, and therefore, is suitable for a windshield wiper of an automobile and the like where precise sealing is not required so long as grease is sufficiently retained. However, this bearing could not be expected to be useful in a hard disk device the space for the hard disk of which must be kept in an extremely clean condition. The reason for this is that even a slight amount of grease adheres to the hard disk, specifically a magnetic recording disk to become dusts in the extremely clean space causing read-out errors.

SUMMARY OF THE INVENTION

An object of the present invention is to provide, with due consideration to the drawbacks of such conventional motor spindles, a motor spindle for a hard disk device which is very small in axial size, and in which grease can be reliably prevented from penetrating the clean space for containing the hard disk.

Another object of the invention is to improve a conventional bearing having a retainer of the integral seal type which is not deemed to be good in seal properties, for application to a motor spindle for a magnetic disk device which requires an extremely clean condition, so that the extremely clean space is completely sealed.

This object is achieved in the present invention by the provision of a motor spindle for a hard disk device having a shaft and a pair of ball bearings each comprising an outer ring, an inner ring, a plurality of balls installed between the shaft of the motor spindle and a housing provided, so that the housing and the shaft rotate relative to each other, a retainer having a first seal plate integrally provided at one side of the retainer, and a second seal plate of a hoop-shape, wherein the outer peripheral edge and the inner peripheral edge of the first seal plate are adjacent to the inner peripheral surface of an outer ring and the outer peripheral surface of an inner ring, respectively, so that one opening of the interior between the inner peripheral surface of the outer ring and the outer peripheral surface of the inner ring is closed.

In addition, the outer peripheral edge of the second seal plate is secured to the inner peripheral surface of the outer ring, so that the other opening of the interior between the inner peripheral surface of the outer ring and the outer peripheral surface of the inner ring is closed by positioning the inner peripheral edge of the hoop-shaped second seal plate adjacent to the outer peripheral surface of the inner ring.

The pair of bearings are arranged such that the first seal plates are opposed to each other; and one of the second seal plates faces to the clean space for the hard disk, whereby the motor spindle for the hard disk device can have a smaller axial size, securely preventing any grease from entering the clean space for the hard disk.

BRIEF DESCRIPTION OF THE DRAWINGS

These and other objects, features, and advantages of the present invention will become more apparent from the following description of the preferred embodiments taken in conjunction with the accompanying drawings, in which:

FIG. 7 is a partly cut-away, partial perspective view of a retainer to be incorporated in the ball bearing of the present invention.

DETAILED DESCRIPTION OF THE PREFERRED EMBODIMENTS

Figure 4:
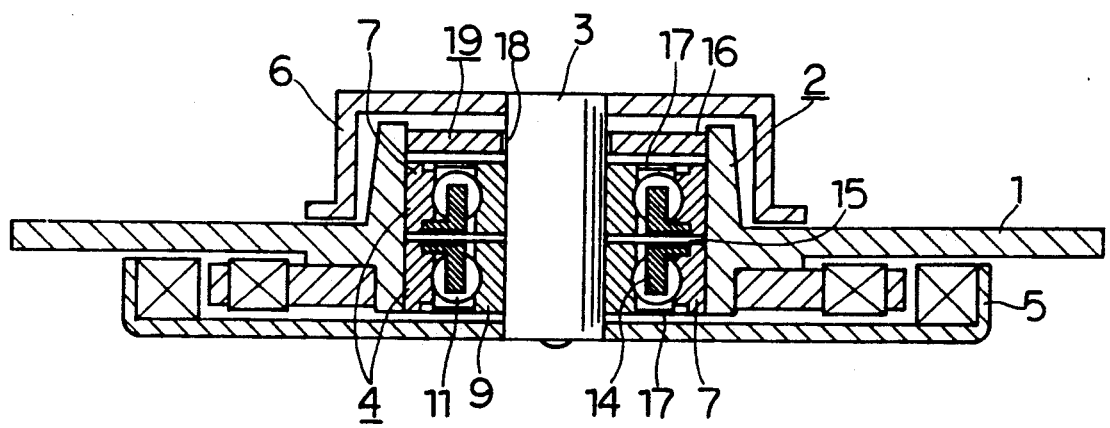
FIG. 4 is a cross sectional view showing a first embodiment of a motor spindle for a hard disk device of the present invention.

Now referring to FIG. 4, a motor spindle for a hard disk device has a housing 2 which is secured to a mounting base or the like by means of a mounting flange 1 formed on the outer peripheral surface of the housing 2. A rotatable shaft 3 is supported in a freely rotatable manner on the inside of the housing 2 through a pair of ball bearings 4. A rotor 5 is secured to one end of the rotatable shaft 3, and a hub 6 is secured to the other end of the rotatable shaft 3. A hard disk (omitted from the drawing) is secured to the hub 6.

Figure 5:
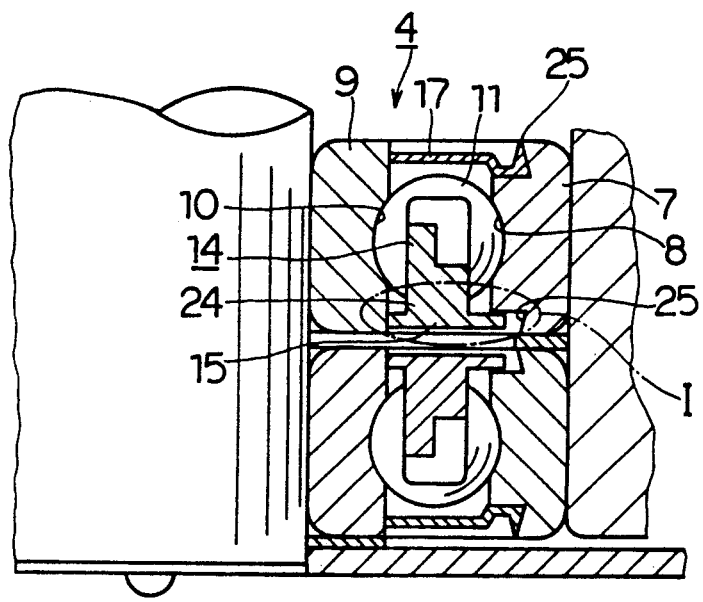
FIG. 5 is an enlarged, partly cut-away, cross sectional view showing a pair of ball bearings incorporated in the motor spindle for the hard disk device of FIG. 4.

The ball bearings 4 which support the rotatable shaft 3 are installed inside the housing 2, as shown in FIG. 5. An inward-facing track 8 is provided on the inner peripheral surface of an outer ring 7; an outward-facing track 10 is provided on the outer peripheral surface of an inner ring 9. A plurality of balls 11 are provided between the inward-facing track 8 and the outward-facing track 10 and supported by a retainer 14.

The retainer 14 for maintaining the balls 11 is integrally formed from a synthetic resin in the shape illustrated in FIG. 7 to have an annular main section 24 and a plurality of arc-shaped support leaves 23. The arc-shaped support leaves 23 are formed so that each pair of opposing support leaves 23 with mutually opposing concave surfaces projects from one side of the annular main section 24 (the upper side in FIG. 7). The balls 11 are each maintained between the pair of adjacent mating support leaves 23 in a sliding relationship with a small gap therebetween. It is preferable that the tips of the support leaves 23 do not project beyond the ball 11. A flange-shaped first seal plate 15 is formed integrally with the retainer 14 on the opposite side of the annular main section 24 (the bottom side in FIG. 7). The first seal plate 15 has inner and outer peripheral edges 20 and 21 placed adjacent to the inner peripheral surface of the outer ring 7 and the outer peripheral surface of the inner ring 9, respectively.

Figure 6:
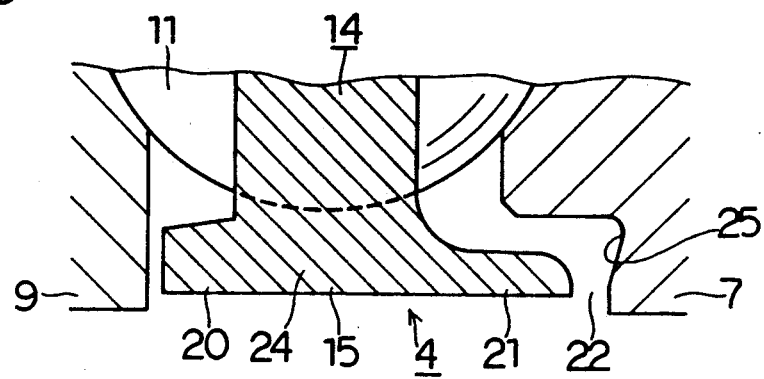
FIG. 6 is an enlarged cross sectional view of the section enclosed by a dotted circular line I in FIG. 5.

Specifically, as is clearly shown in FIG. 6, the inner peripheral edge 20 of the first seal plate 15 is opposed to the outer peripheral surface of the inner ring 9 at an edge portion with a smooth surface finish. There is a radially inner gap between the edge 20 and the inner ring 9, which is extremely small (for example, gap size 0.2 to 1.0% of the outer diameter of inner ring 9 at the edge portion, which may be referred to as gap diameter). As a result, the first seal plate 15 is slidingly guided by the inner ring 9. At the same time, a labyrinth seal is formed between the outer peripheral surface of the inner ring 9 and the inner peripheral edge 20 of the first seal plate 15.

On the outer side of the first seal plate 15, a radially outer gap is formed between the outer peripheral edge 21 of the first seal plate 15 and the inner peripheral surface of the outer ring 7 at one edge portion. Specifically, the edge portion of the outer ring 7 is formed with an indented groove portion or shoulder portion 25. The radially outer gap is made larger (for example, a gap size 1.0 to 4.0% of the inner diameter of the outer ring 7 at the edge portion mating to the gap, which may also be referred to as gap diameter) than the radially inner gap, and a labrinth seal 22 is also formed at the gap. The first seal plate 15, slidingly supported by the balls 11, the outer peripheral surface of the inner ring 9 and the inner peripheral surface of the outer ring 7 through the gaps therebetween, is a kind of floating seal member.

Consequently, the torque loss from the presence of the first seal plate 15 is small and the dimensional precision of the gap of the labyrinth seal 22 is stable, so that sealing obtained from the first seal plate 15 is improved.

The outer peripheral edge of the first seal plate 15 may also be opposed to a central straight section (a part closer to the center than the indented groove portion or shoulder portion 25) of the inner peripheral surface of the outer ring 7. In addition, differing from the above example, the retainer 14 may be fabricated so as to be guided by the outer ring 7, or by the balls 11. In the case where the retainer 14 is fabricated so as to be guided by the outer ring 7, the size relationship between the radially inner gap at the inner peripheral edge of the first seal plate 15 and the radially outer gap at the outer peripheral edge of the first seal plate 15 are reversed, as opposed to the case as mentioned above where the retainer 14 is fabricated so as to be guided by the inner ring 9. In addition, in the case where the retainer 14 is fabricated so as to be guided by the balls 11, both of the radially inner and outer gaps at the inner and outer peripheral edges of the first seal plate 15 can be made larger (1.0 to 4.0% of the respective gap diameters).

The outer peripheral edge of a second seal plate 17, which is formed as a hoop from a metal plate, is supportedly secured to the inner peripheral surface at the other edge portion of the outer ring 7. The second seal plate 17 is a kind of fixed seal member.

When assembling the motor spindle of the embodiment shown in the drawings, a pair of indented groove portions or shoulder portions 25 are formed in symmetrical positions on the inner peripheral surface at the two edge portions of the outer ring 7. The outer peripheral edge of the second seal plate 17 is engaged in one of the indented groove portions or shoulder portions 25 so that the second seal plate 17 is secured with respect to the outer ring 7. The other indented groove portion or shoulder portion 25 opposes the outer peripheral edge of the first seal plate 15 so that the labyrinth seal 22 is formed between the outer peripheral edge of the first seal plate 15 and the inner peripheral surface of the outer ring 7. Accordingly, during the assembly of the ball bearings 4 having such an indented groove portion or shoulder portion 25 on either side thereof, it is not necessary to consider the orientation of the first seal plate 15 relative to the outer ring 7 when assembling the ball bearings 4.

Two ball bearings 4 of this configuration make up one assembly which is installed in the part between the outer peripheral surface of the rotatable shaft 3 and the inner peripheral surface of the housing 2. In this case, the first seal plates 15 of the two ball bearings 4 are opposed to each other, and one of the second seal plates 17 faces the clean space side (the upper side in FIG. 4). In this way, when the outer peripheral edge of the second seal plate 17 is secured to the outer ring 7, a high sealing effect is created to contain the grease which is collected at the outer periphery by centrifugal force when the inner ring 9, balls 11 and the retainer 12 rotate, so that the grease is reliably prevented from penetrating the clean space for containing the hard disk. The second seal plate 17 of the ball bearing 4, which is present on the side (the lower side in FIG. 4) opposite to the clean space, faces outward and prevents dust particles and the like, which are floating outside, from entering the ball bearings 4. The first seal plate 15 together with the second seal plate 17 prevents foreign materials such as dust and the like from entering the ball bearings 4 prior to installing the bearings 4 to the housing 2, and also prevents the grease sealed inside the bearings 4 from leaking out to reduce lubrication performance.

In addition, in the embodiment shown in the drawings, a magnetic fluid seal device 19 is provided between the outer peripheral surface of the rotatable shaft 3 and the inner peripheral surface of the housing 2 in a space between the ball bearing 4 on the clean space side and the hub 6. The magnetic fluid seal device 19 comprises a ring-shaped pole piece 16 and a magnetic fluid 18 such as ferrofluid. By the magnetic fluid seal device 19, grease is more reliably prevented from entering the clean space provided for the hard disk.

In the motor spindle for a hard disk device of the present invention with the above-described configuration, the first seal plate 15 is provided at one side of the retainer 14. For this reason, interference which would be caused between the seal plate 13 and the retainer 12 as with the conventional motor spindle for the hard disk device where the seal plate 13 is separately provided from the retainer 12, are avoided in the present invention, so that it is unnecessary for the distance between the seal plate 13 and the ball 11 to be any greater than absolutely necessary.

Then, as the distance between the ball 11 and the first seal plate 15 is reduced, the width w of the ball bearing 4 (FIG. 5) is made smaller, and the axial size t [FIG. 4] of the motor spindle incorporating the ball bearings 4 can be made smaller.

In addition, the second seal plate 17 which has good sealing characteristics is faced to the clean space provided for the hard disk, so that any grease which is present in the interior defined by the inner peripheral surface of the outer ring 7 and the outer peripheral surface of the inner ring 9 containing the balls 11, can be reliably prevented from entering the clean space.

It should be noted that leakage of grease and deterioration of lubrication by the leakage of grease can be prevented also by the first seal plate 15.

Figure 1:
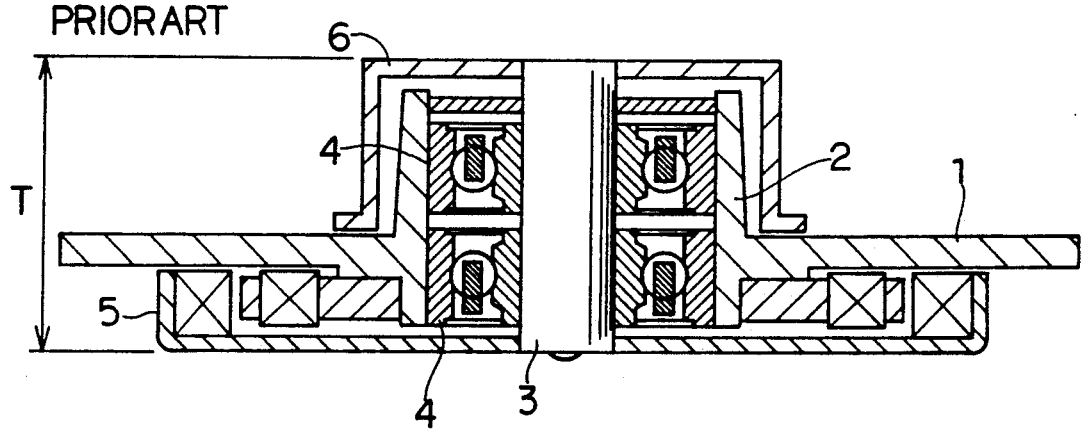
FIG. 1 is a cross sectional view showing the total structure of a conventional motor spindle for driving a hard disk.
Figure 2:
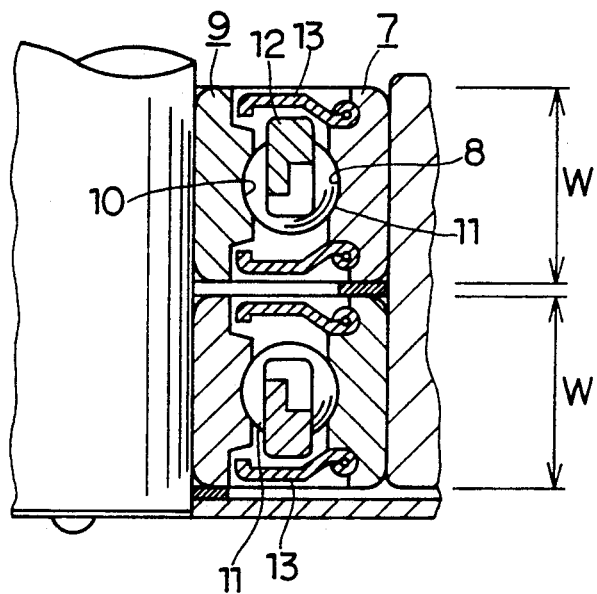
FIG. 2 is an enlarged, partly cut-away, cross sectional view showing a pair of ball bearings installed in the motor spindle of FIG. 1.
Figure 3:
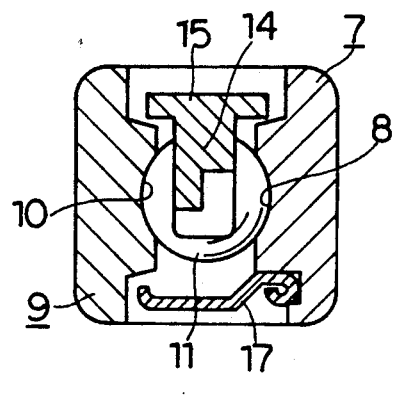
FIG. 3 is a partly cut-away, enlarged cross sectional view showing a ball bearing in another conventional motor spindle for a hard disk device.

A feature of the present invention, in the case of a ball 11 with an outer diameter of 0.7 to 4.0 mm, is that the width of the ball bearings 4 is 0.7 to 1.5 mm greater than the outer diameter of the ball 11. If this dimension is less than 0.7 mm, it is difficult to ensure the minimum thickness required for a main section 24 of the retainer 14 and the second seal plate 17, and it is difficult to ensure the minimum dimensions required to avoid interference of the structural parts. Conversely, if this dimension exceeds 1.5 mm, the slimming effect on the total assembly width in comparison with the conventional motor spindle as shown in FIG. 1 is lost.

The motor spindle for a hard disk device of the present invention is not limited to the bottom rotor type of motor spindle shown in FIG. 4, but can be applied to another type of motor spindle to reduce the thickness of the motor.

Figure 8I:
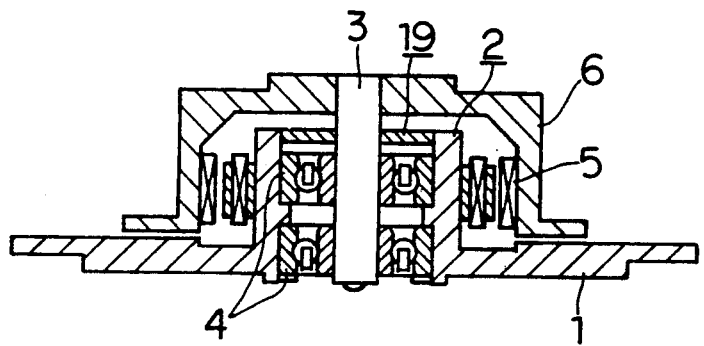
FIG. 8(I) is a cross sectional view of a second example of a conventional motor spindle for a hard disk device.
Figure 8:
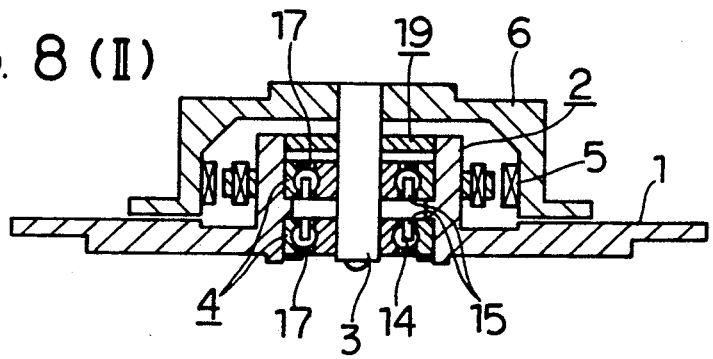
FIG. 8(II) is a cross sectional view showing an application of the present invention in the motor spindle for the hard disk device of FIG. 8(I).
Figure 9I:
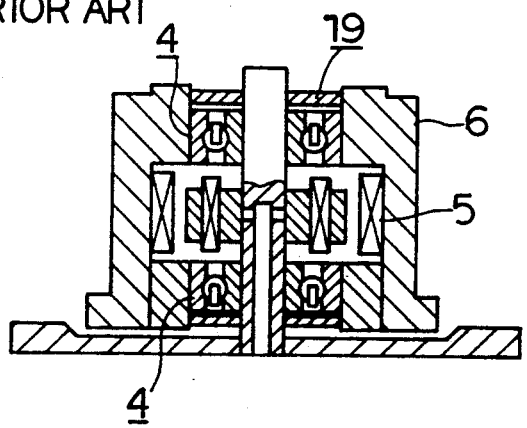
FIG. 9(I) is a cross sectional view of a third example of a conventional motor spindle for a hard disk device.
Figure 9:
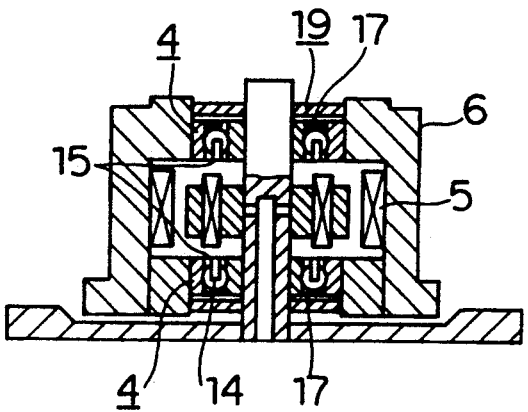
FIG. 9(II) is a cross sectional view showing an application of the present invention in the motor spindle for the hard disk device of FIG. 9(I).

For example, the present invention can be applied to a conventional in-hub type of motor spindle in which an inner ring is rotating as shown in FIG. 8(I) to provide a new and improved in-hub type of motor spinle with a small axial size as shown in FIG. 8(II), or, to a conventional in-hub type of motor spindle as shown in FIG. 9(I) in which an outer ring is rotating to provide a new and improved in-hub type of motor spindle with a small axial size as shown in FIG. 9(II).

It should be noted that in the motor spindle of FIG. 9(II), the outer ring, the balls and the retainer 14 rotate to produce a centrifugal force to urge the grease to be collected to the outer peripheral edge of the second seal plate 17.

The motor spindle for a hard disk device of the present invention is very thin in axial size and can provide a more compact hard disk device incorporating a motor spindle. Furthermore, foreign materials such as grease and the like can be reliably prevented from penetrating the clean space for containing the hard disk.

What is claimed is:

1. A motor spindle for a hard disk device, comprising:
   a shaft extending to a clean zone for containing a hard disk;
   a housing positioned for a relative relation with respect to said shaft;
   a pair of ball bearings fitted between said housing and said shaft and juxtaposed to each other along said shaft, said ball bearings each comprising an inner ring fitted onto said shaft, an outer ring mounted to said housing and a plurality of balls provided between said inner and outer rings;
   a retainer provided for each ball bearing and being integrally fabricated from a synthetic resin and comprising an annular main section and a plurality of pairs of support leaves radially outwardly projecting from said annular main section to maintain each of said balls in a freely rolling state between each pair of said support leaves;
   said main section being provided with a floating seal member formed integrally with said main section and floating with respect to said inner ring and said outer ring to hold grease within said bearings; and
   an annular fixed seal member provided in each of said ball bearings and being secured to said outer ring and extending between said outer ring and said inner ring thereof so that said balls are placed between said fixed seal member and said retainer with floating seal members of said ball bearings facing each other and with the fixed seal member of at least one of said ball bearings facing said clean zone;
   said floating seal members being positioned close to each other in an axial direction of said shaft so that the motor spindle is very thin in said axial direction, said fixed seal member of at least one of said ball bearings facing said clean zone being positioned between said outer ring and said inner ring so that any dust of said grease is prevented from contaminating said clean zone.

2. The motor spindle for a hard disk device of claim 1, wherein said balls have an outer diameter of 0.7 to 4.0 mm, and the ball bearings have a width 0.7 to 1.5 mm greater than said outer diameter of said balls.

3. The motor spindle for a hard disk device of claim 1, wherein said outer ring has a peripheral inner surface having a pair of symmetrical indented groove portions formed at two symmetrical edge portions of said inner peripheral surface; said fixed seal member having a peripheral edge engaged in one of said indented groove portions so that said fixed seal member is secured to said outer ring, and another of said indented groove portions facing an outer peripheral edge of said floating seal member so that a labyrinth seal is formed between said outer peripheral edge of said floating seal member and said inner peripheral surface of said outer ring.

4. The motor spindle for a hard disk device of claim 2, wherein said outer ring has a peripheral inner surface having formed at two symmetrical edge portions of said inner peripheral surface; said fixed seal member having a peripheral edge engaged in one of said indented groove portions so that said fixed seal member is secured to said outer ring, and another of said indented groove portions facing an outer peripheral edge of said floating seal so that a labyrinth seal is formed between said outer peripheral edge of said floating seal member and said inner peripheral surface of said outer ring.

* * * * *